United States Patent
Lee et al.

(10) Patent No.: US 6,900,869 B1
(45) Date of Patent: May 31, 2005

(54) MULTI-DOMAIN LIQUID CRYSTAL DISPLAY DEVICE WITH PARTICULAR DIELECTRIC STRUCTURES

(75) Inventors: Yun Bok Lee, Kunpo-shi (KR); Kyeong Jin Kim, Bucheon-shi (KR); Jang Jin Yoo, Seoul (KR); Jae Yoon Lee, Seoul (KR); Do Hee Kwon, Koyang-shi (KR)

(73) Assignee: LG. Philips LCD Co., Ltd., Seoul (KR)

( * ) Notice: Subject to any disclaimer, the term of this patent is extended or adjusted under 35 U.S.C. 154(b) by 0 days.

(21) Appl. No.: 09/448,276

(22) Filed: Nov. 24, 1999

(30) Foreign Application Priority Data

Nov. 25, 1998 (KR) .............................................. 98-50708
Feb. 18, 1999 (KR) ........................................ 1999-05401

(51) Int. Cl.$^7$ .......................................... G02F 1/1337
(52) U.S. Cl. ......................................... 349/129; 349/84
(58) Field of Search ........................... 349/129, 84, 191

(56) References Cited

U.S. PATENT DOCUMENTS

| | | | |
|---|---|---|---|
| 4,581,608 A | 4/1986 | Aftergut et al. | 340/704 |
| 4,728,175 A | 3/1988 | Baron | 350/336 |
| 4,937,566 A | 6/1990 | Clerc | 340/784 |
| 4,978,203 A | 12/1990 | Yamazaki et al. | 350/339 R |
| 5,249,070 A | 9/1993 | Takano | 359/54 |
| 5,309,264 A | 5/1994 | Lien et al. | |
| 5,510,916 A | 4/1996 | Takahashi | |
| 5,574,582 A | 11/1996 | Takeda et al. | 359/59 |
| 5,623,354 A | 4/1997 | Lien et al. | 349/124 |
| 5,668,650 A | 9/1997 | Mori et al. | 349/42 |
| 5,673,092 A | 9/1997 | Horie et al. | |
| 5,699,139 A | 12/1997 | Aastuen et al. | |
| 5,737,051 A | 4/1998 | Kondo et al. | 349/141 |
| 5,777,701 A | 7/1998 | Zhang | 349/44 |
| 5,963,290 A * | 10/1999 | Murai et al. | 349/191 |
| 6,061,117 A * | 5/2000 | Horie et al. | 349/156 |
| 6,344,883 B2 * | 2/2002 | Yamada et al. | 349/32 |
| 6,356,335 B1 | 3/2002 | Kim et al. | |
| 6,473,142 B2 | 10/2002 | Kim et al. | |
| 6,525,794 B1 | 2/2003 | Kim et al. | |

FOREIGN PATENT DOCUMENTS

| | | |
|---|---|---|
| DE | 19950366 A1 | 5/2000 |
| EP | 0 752 611 | 1/1997 |

(Continued)

OTHER PUBLICATIONS

Ternent et al, Single State Amplifiers on a CMOS Grade Silicon Substrate using a Polymer Interlayer Dielectric with Strained Silicon MOSFETs, University of Glasgow, Glasgow, UK.*

(Continued)

Primary Examiner—Tarifur R. Chowdhury
Assistant Examiner—Timothy Rude
(74) Attorney, Agent, or Firm—McKenna Long & Aldridge LLP

(57) ABSTRACT

A multi-domain liquid crystal display device includes first and second substrates facing each other and a liquid crystal layer between the first and second substrates. A plurality of gate bus lines are arranged in a first direction on the first substrate and a plurality of data bus lines are arranged in a second direction on the first substrate to define a pixel region. A pixel electrode is electrically charged through the data bus line in the pixel region. A dielectric frame is in a region other than a region where the pixel electrode is formed, and distorts electric field applied to the liquid crystal layer. A common electrode is on the second substrate, and an alignment layer is on at least one substrate between the first and second substrates.

38 Claims, 25 Drawing Sheets

FOREIGN PATENT DOCUMENTS

| | | |
|---|---|---|
| EP | 0 814 142 | 12/1997 |
| EP | 0 854 377 | 7/1998 |
| EP | 0 884 626 | 12/1998 |
| EP | 0884626 | 12/1998 |
| EP | 1030211 | 8/2000 |
| EP | 1103840 A2 | 5/2001 |
| EP | 1111441 A2 | 6/2001 |
| EP | 1113311 A2 | 7/2001 |
| EP | 1113311 A3 | 1/2002 |
| GB | 2 296 810 | 7/1996 |
| GB | 2 321 718 | 8/1998 |
| GB | 2 337 843 | 1/1999 |
| GB | 2343012 | 4/2000 |
| GB | 2343012 A | 4/2000 |
| GB | 2347779 | 9/2000 |
| GB | 2358576 A | 8/2001 |
| JP | 05-297412 | 11/1993 |
| JP | 8292423 | 11/1996 |
| JP | 09-197420 | 7/1997 |
| JP | 09-230387 | 9/1997 |
| JP | 11242225 | 9/1999 |
| JP | 11-258605 | 9/1999 |
| JP | 2000075275 | 3/2000 |
| JP | 2000305086 | 8/2000 |
| WO | 961 0774 | 4/1996 |
| WO | WO 00/08521 | 2/2000 |

OTHER PUBLICATIONS

CRC Handbook of Chemistry and Physics, 78th Edition, 1997, Chemical Rubber Publishing Company, 3 pages only, especially p. 13–12.*

V. A. Konovalov, et al., "Multi–Domain Vertically Aligned Mode", 1998 SID International Symposium Digest of Technical Papers, 4 pages.

Preliminary Search Report dated Jun. 3, 2004 by the French Patent Office.

A. Lien, R.A. John, Two–Domain, TN–LCDs Fabricated by Parallel Fringe Field Method, SID Digest, 1993, pp. 269–272.

A. Lien, R.A. John, TFT–Addressed Two–Domain TN VGA Displays Fabricated Using the Parallel Fringe Field Method, SID Digest, 1994, pp. 594–597.

N. Koma, Y. Baba, K. Matsuoka, No–Rub Multi–Domain TFT–LCD Using Surrounding–Electrode Method, SID Digest, 1995, pp. 869–872.

H. Murai, M. Suzuki, S. Kaneko, Novel High Contrast Random and Controlled 4–Domain CTN–LCDs with Wide Viewing Angle, Euro Display '96, pp. 159–161.

Y. Koike, S. Kataoka, T. Sasaki, H. Chida, H. Tsuda, A. Takeda and K. Ohmuro, T. Sasabayashi, K. Okamoto, A Vertically Aligned LCD Providing Super–High Image Quality, IDW '97, pp. 159–162.

N. Koma, R. Nishikawa, Development of a High–Quality TFT–LCD for Projection Displays, SID Digest, 1997, pp. 461–464.

K. Ohmuro, S. Kataoka, T. Sasaki, Y. Koike, Development of Super–High Image Quality Vertical Alignment Mode LCD, SID Digest,1997, pp. 845–848.

U.S. Appl. No. 09/250,262, filed Feb. 1999, Kim et al.

U.S. Appl. No. 09/357,247, filed Jul. 1999, Lee.

U.S. Appl. No. 09/537,570, filed Mar. 2000, Kim et al.

U.S. Appl. No. 09/256,180, filed Feb. 1999, Seo et al.

U.S. Appl. No. 09/326,415, filed Jan. 1999, Kim et al.

U.S. Appl. No. 09/421,114, filed Oct. 1999, Kim et al.

U.S. Appl. No. 09/448,276, filed Nov. 1999, Lee et al.

U.S. Appl. No. 09/497,507, filed Feb. 2000, Lee et al.

U.S. Appl. No. 09/327,283, filed Jan. 1999, Yoo et al.

U.S. Appl. No. 09/598,213, filed Jun. 2000, Kim et al.

U.S. Appl. No. 09/541,426, filed Apr. 2000, Kim et al.

U.S. Appl. No. 09/567,134, filed May 2000, Kim et al.

U.S. Appl. No. 09/618,165, filed Jul. 2000, Choi et al.

* cited by examiner

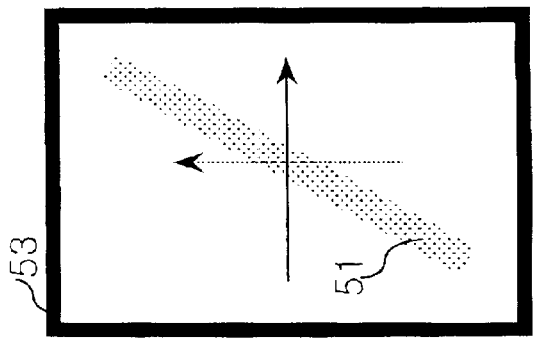
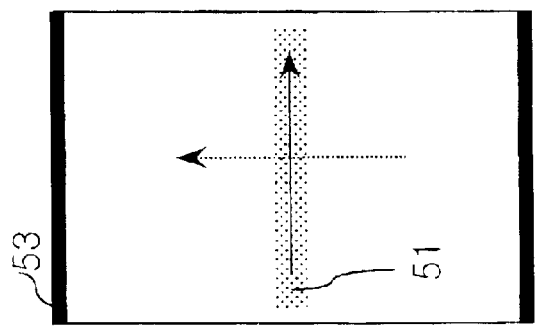
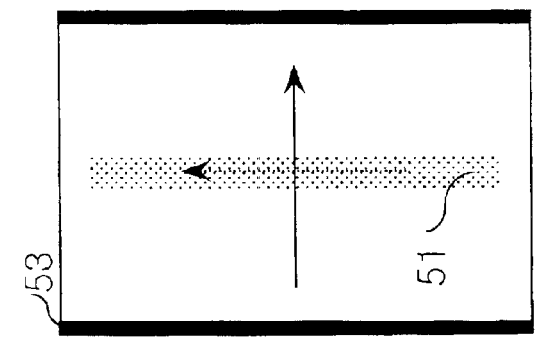
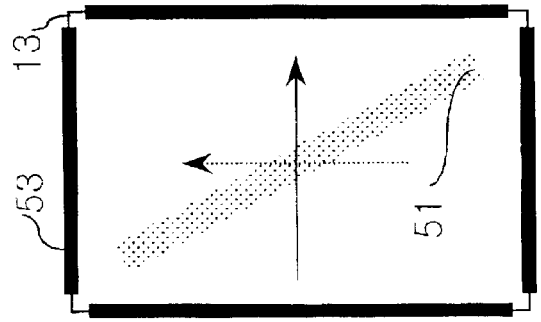

MULTI-DOMAIN LIQUID CRYSTAL DISPLAY DEVICE WITH PARTICULAR DIELECTRIC STRUCTURES

This application claims the benefit of Korean Application No. 1998-50708 filed Nov. 25, 1998 and No. 1999-05401 filed Feb. 18, 1999, which are hereby incorporated by reference. This application also incorporates by reference U.S. patent application Ser. No. 09/326,415 filed Jun. 4, 1999, entitled "MULTI-DOMAIN LIQUID CRYSTAL DISPLAY DEVICE" and Ser. No. 09/421,114 filed Oct. 19, 1999, entitled "A MULTI-DOMAIN LIQUID CRYSTAL DISPLAY DEVICE," both of which are assigned to the same assignee as the present application.

BACKGROUND OF THE INVENTION

1. Field of the Invention

The present invention relates to a liquid crystal display device (LCD), and more particularly, to a liquid crystal display device having a dielectric frame.

2. Description of the Related Art

Recently, an LCD has been proposed where the liquid crystal is not aligned and the liquid crystal is driven by common-auxiliary electrodes insulated from pixel electrodes. FIG. 1 is sectional view of pixel unit of the conventional LCDs.

Regarding conventional LCDs, a plurality of gate bus lines arranged in a first direction on a first substrate and a plurality of data bus lines arranged in a second direction on the first substrate divide the first substrate into a plurality of pixel regions.

A thin film transistor (TFT) applies image signal delivered from the data bus line to a pixel electrode 13 on a passivation layer 37. The TFT is formed on each pixel region and comprises a gate electrode, a gate insulator, a semiconductor layer, a source electrode, and a drain electrode, etc.

Side electrode 15 is formed surrounding the pixel electrode 13 on the gate insulator, thereon passivation layer 37 is formed over the whole first substrate, and a part of pixel electrode 13 overlaps side electrode 15.

Alternatively, pixel electrode 13 is formed on the gate insulator, and passivation layer 37 is formed over the whole first substrate.

On second substrate, a common electrode 17 is formed and together with pixel electrode 13 applies electric field to a liquid crystal layer. Side electrode 21 and open area (slit) 27 distort the electric field applied to the liquid crystal layer. Then, in a unit pixel liquid crystal molecules are driven variously. This means that when voltage is applied to the LCD, dielectric energy due to the distorted electric field arranges the liquid crystal directors in needed or desired positions.

In the LCDs, however, open area 27 in common electrode 17 or pixel electrode 13 is necessary, and the liquid crystal molecules could be driven stably when the open area is wider. If the electrodes do not have an open area or the width of the open area is narrow, the electric field distortion needed to divide the pixel region becomes weak.

Then, when voltage over a threshold voltage, $V_{th}$, is applied, the time needed to stabilize the liquid crystal directors increases. In particular, the response time can be over 100 msec. At this time, disclination occurs from the area where the liquid crystal directors are parallel with a transmittance axis of the polarizer, which results in a decrease in brightness. Further, according to the surface state of LCDs, the liquid crystal texture has an irregular structure.

SUMMARY OF THE INVENTION

Accordingly, the present invention is directed to an LCD that substantially obviates one or more problems due to limitations and disadvantages of the related art.

An object of the present invention is to provide a multi-domain LCD having high response time characteristics and high brightness by stable arrangement of liquid crystal molecules.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve the objects and in accordance with the purpose of the invention, as embodied and broadly described herein, a multi-domain liquid crystal display device comprises first and second substrates facing each other, a liquid crystal layer between the first and second substrates, a plurality of gate bus lines arranged in a first direction on the first substrate and a plurality of data bus lines arranged in a second direction on the first substrate to define a pixel region, a pixel electrode in the pixel region, a dielectric frame in a region other than a region where the pixel electrode is formed, the dielectric frame distorting electric field applied to the liquid crystal layer, a common electrode on the second substrate, and an alignment layer on at least one substrate between the first and second substrates.

The dielectric frame maintains uniformly gap between the first and second substrates, or shields light leakage from a region other than the pixel region.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of the specification, illustrates embodiments of the invention and together with description serve to explain the principles of the invention.

In the drawings:

FIGS. 6A, 6B, 6C, and 6D are plan views showing various electric field inducing window and dielectric frame of the multi-domain liquid crystal display devices according to an embodiment of the present invention;

DETAILED DESCRIPTION OF THE PREFERRED EMBODIMENTS

Hereinafter, the multi-domain liquid crystal display device of the present invention is explained in detail by accompanying the drawings.

Figure 1:
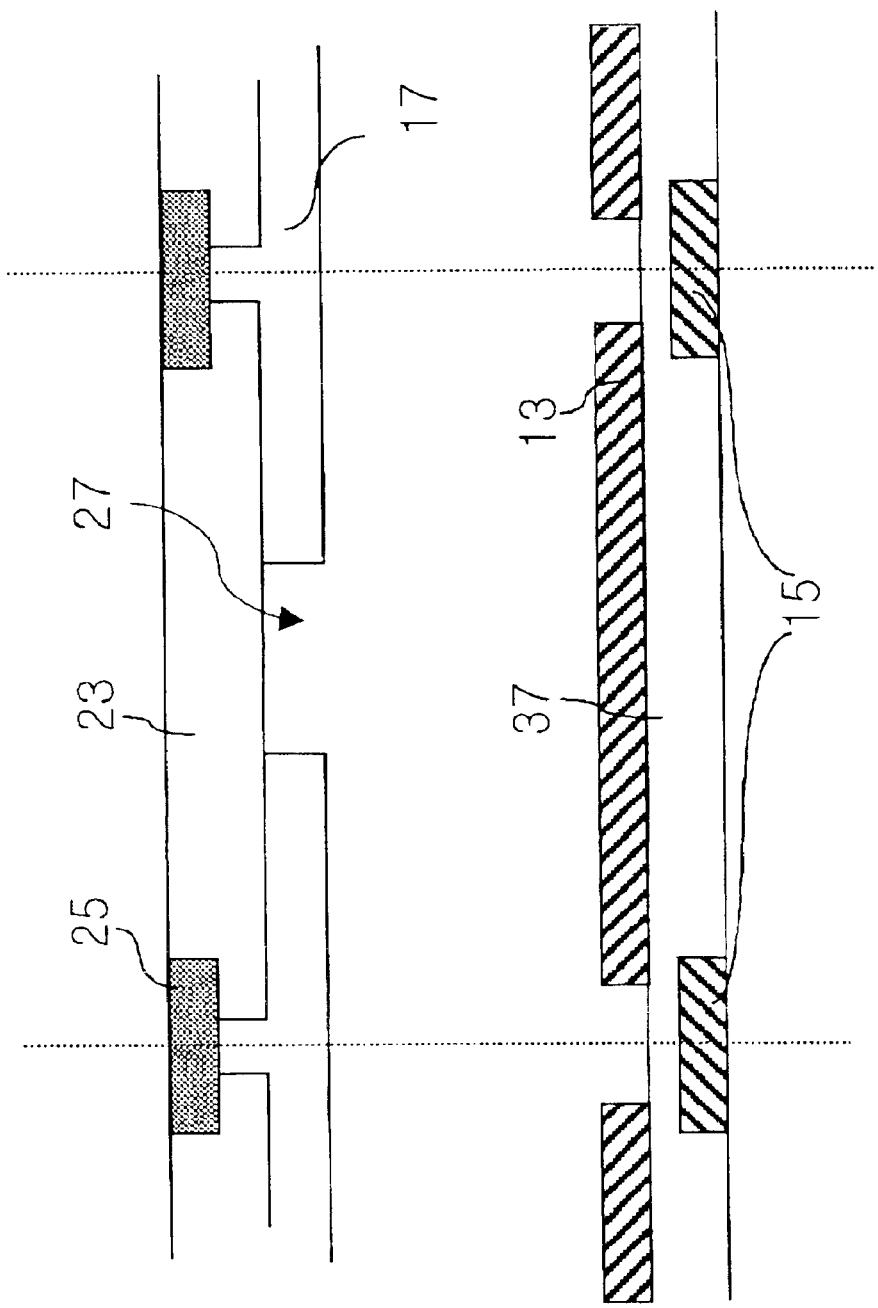
FIG. 1 is a sectional view of the liquid crystal display device in the related art.
Figure 2A:
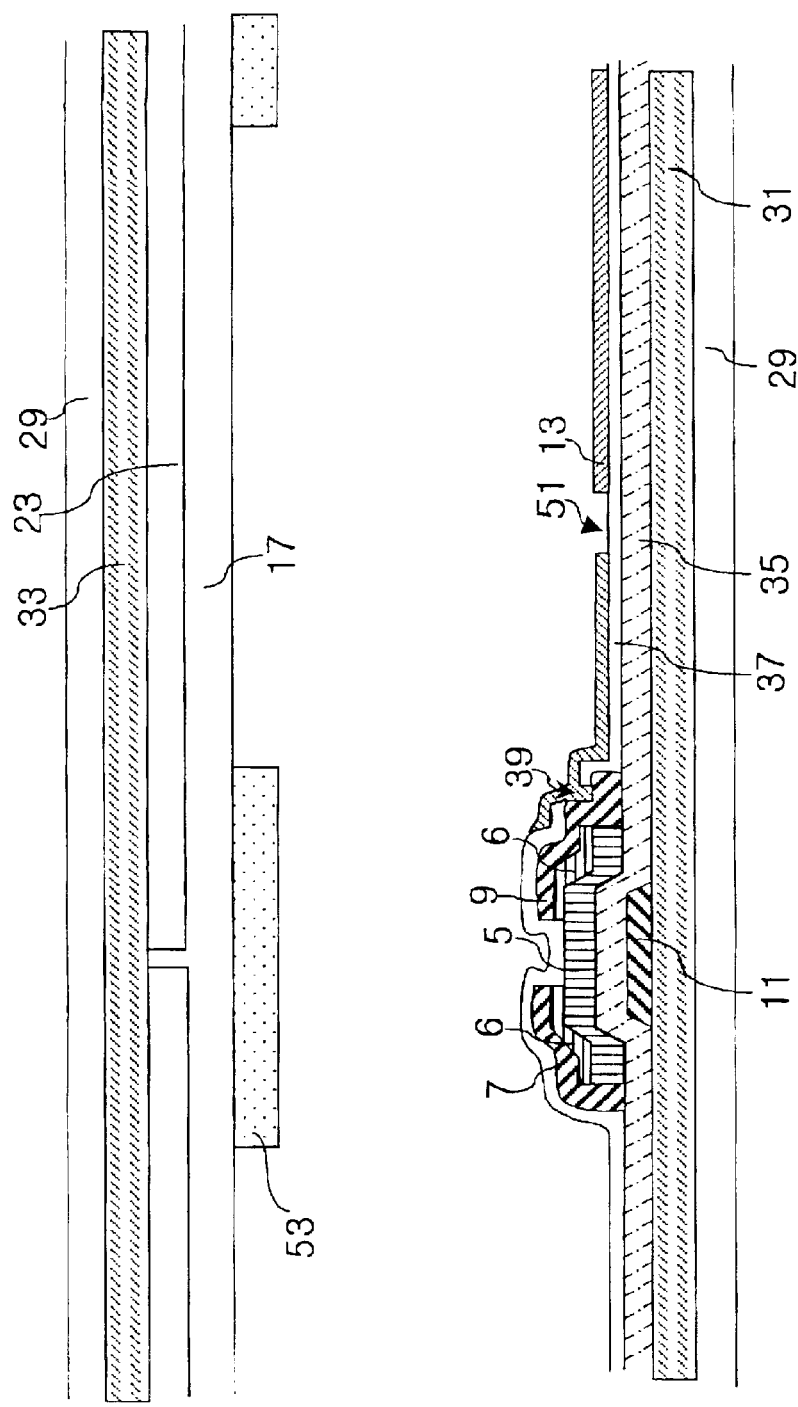
FIGS. 2A, 2B, 2C, and 2D are sectional views of the multi-domain liquid crystal display devices according to the first embodiment of the present invention.
Figure 2B:
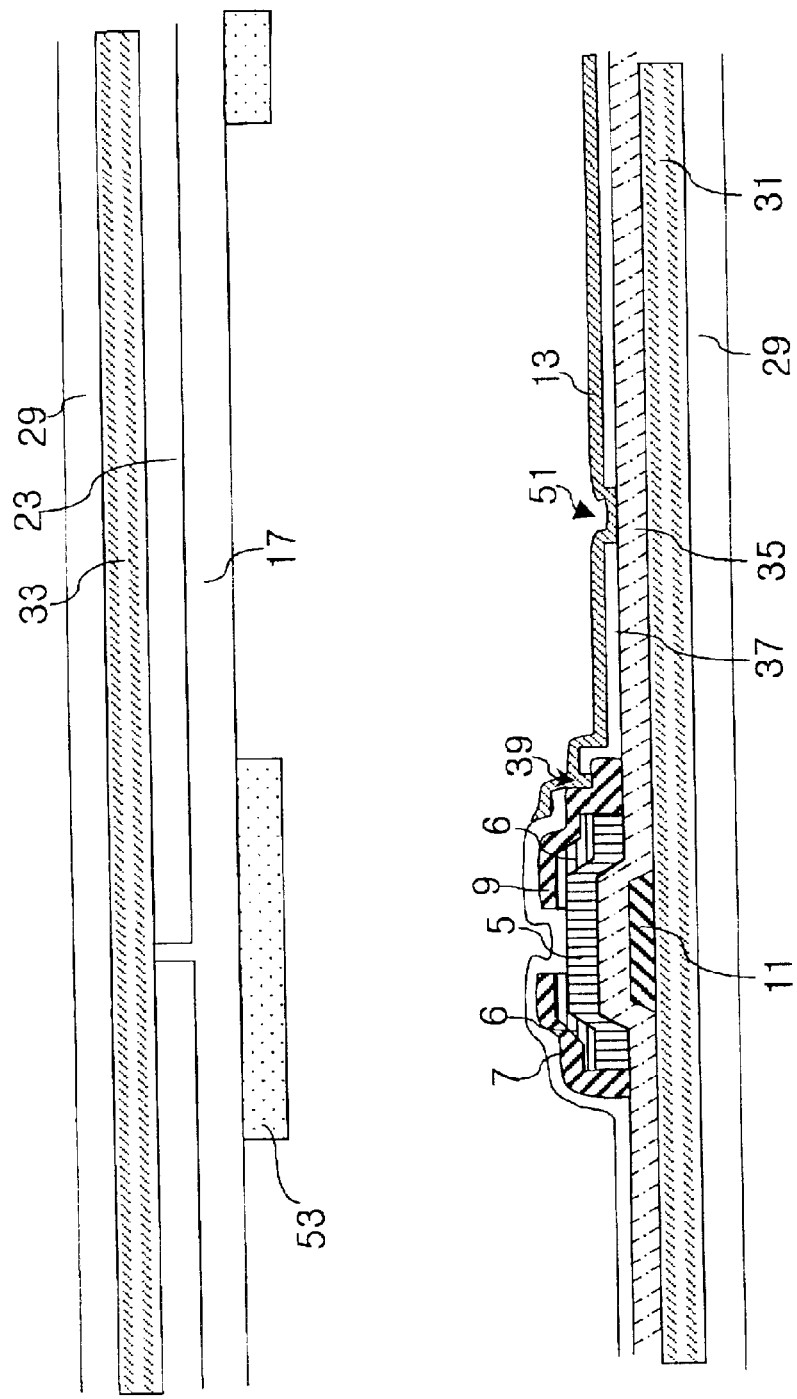
Figure 2C:
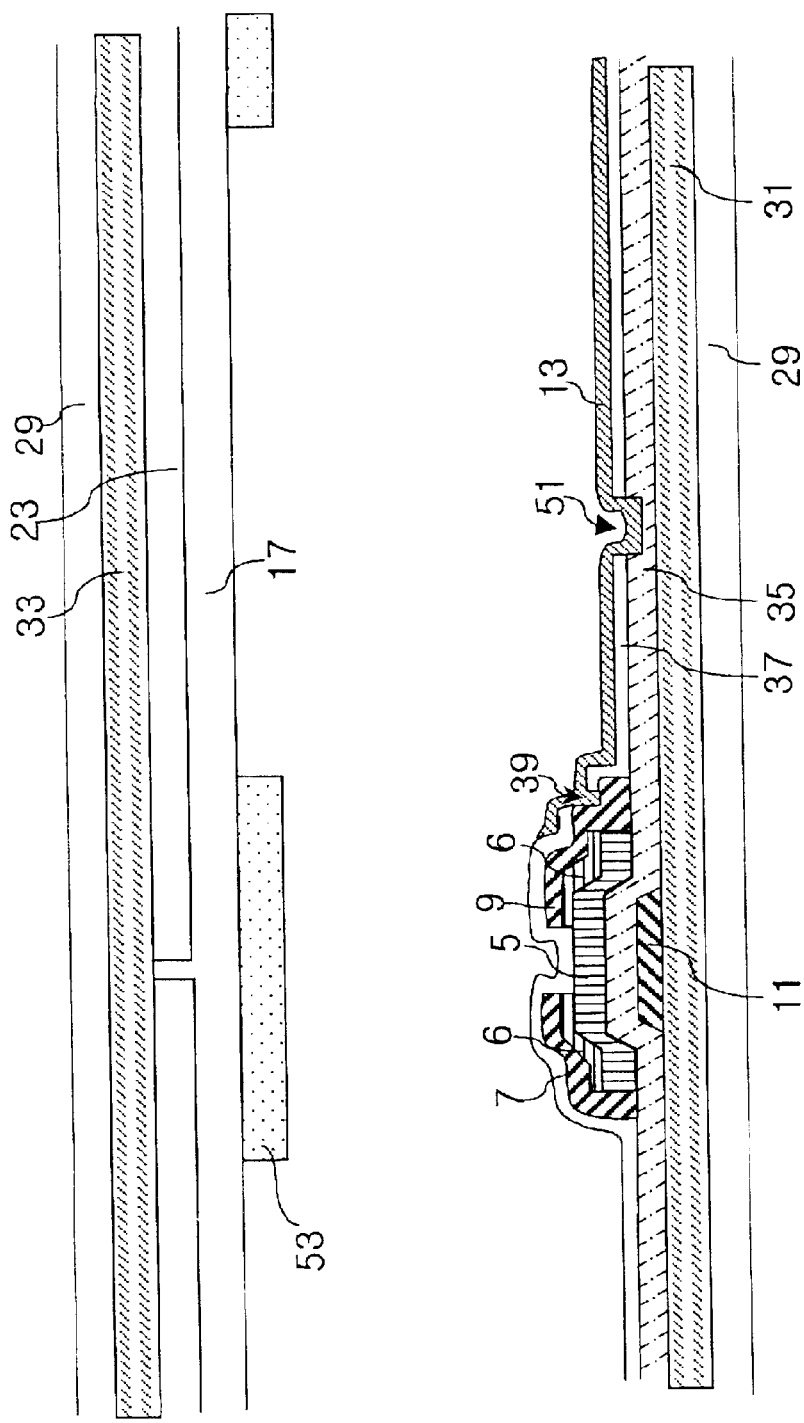
Figure 2D:
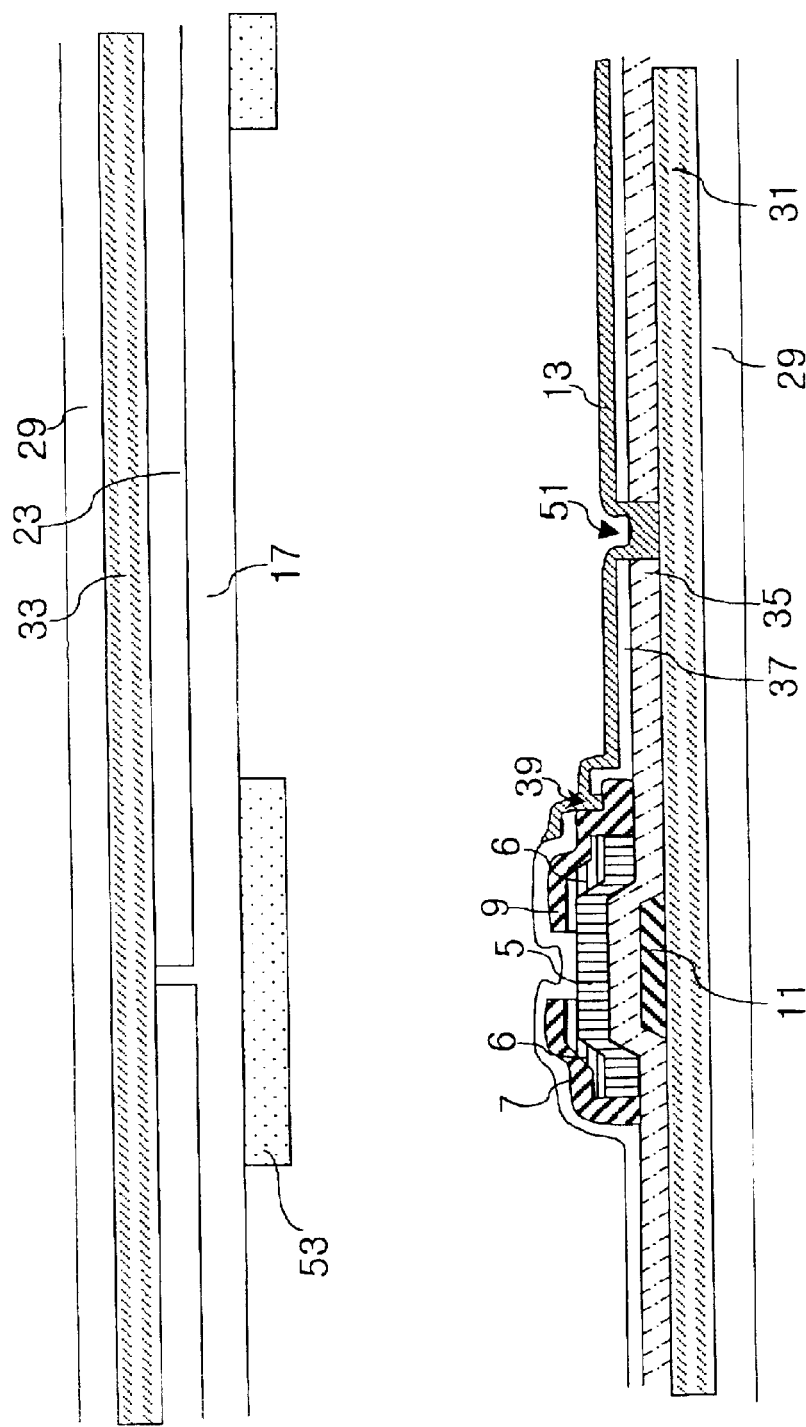
Figure 3A:
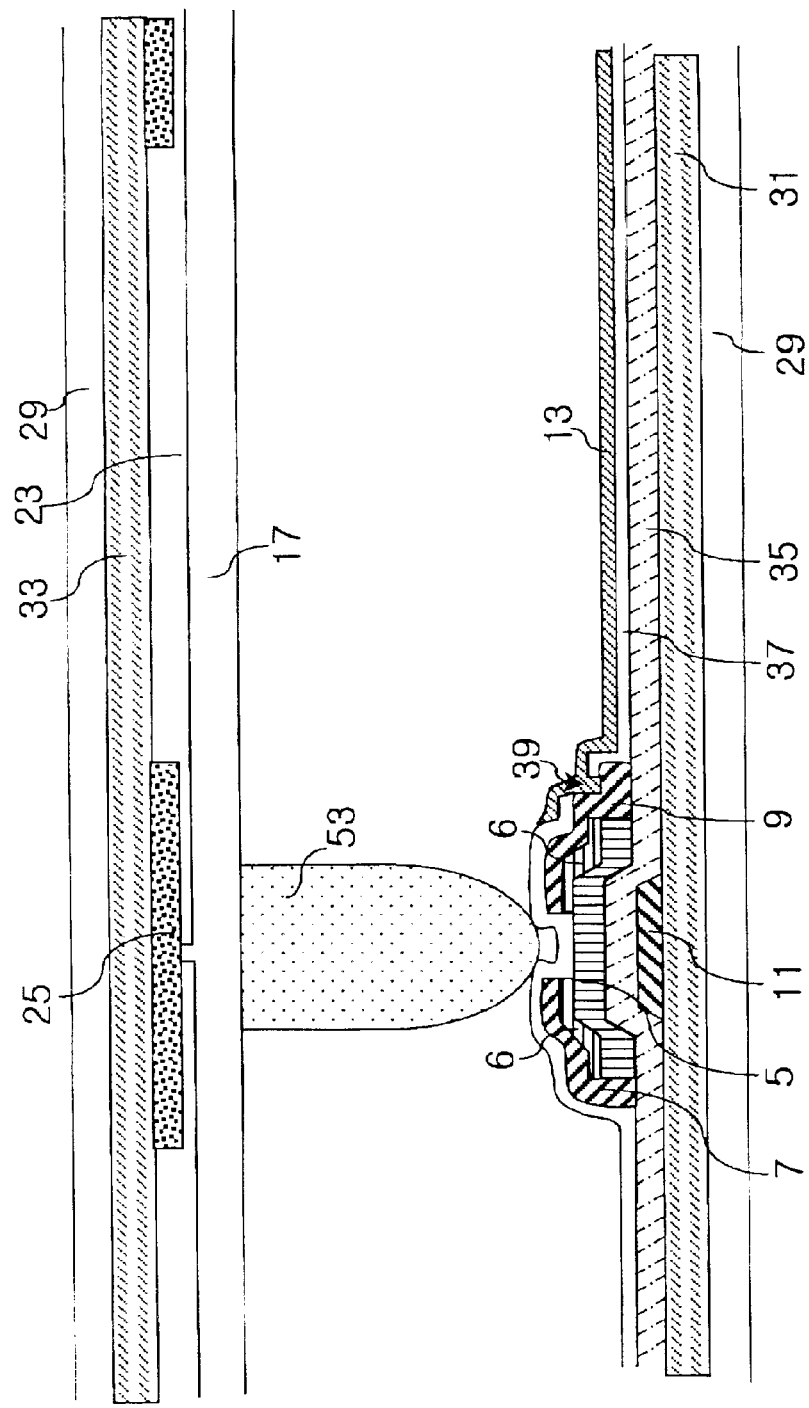
FIGS. 3A, 3B, and 3C are sectional views of the multi-domain liquid crystal display devices according to the second embodiment of the present invention.
Figure 3B:
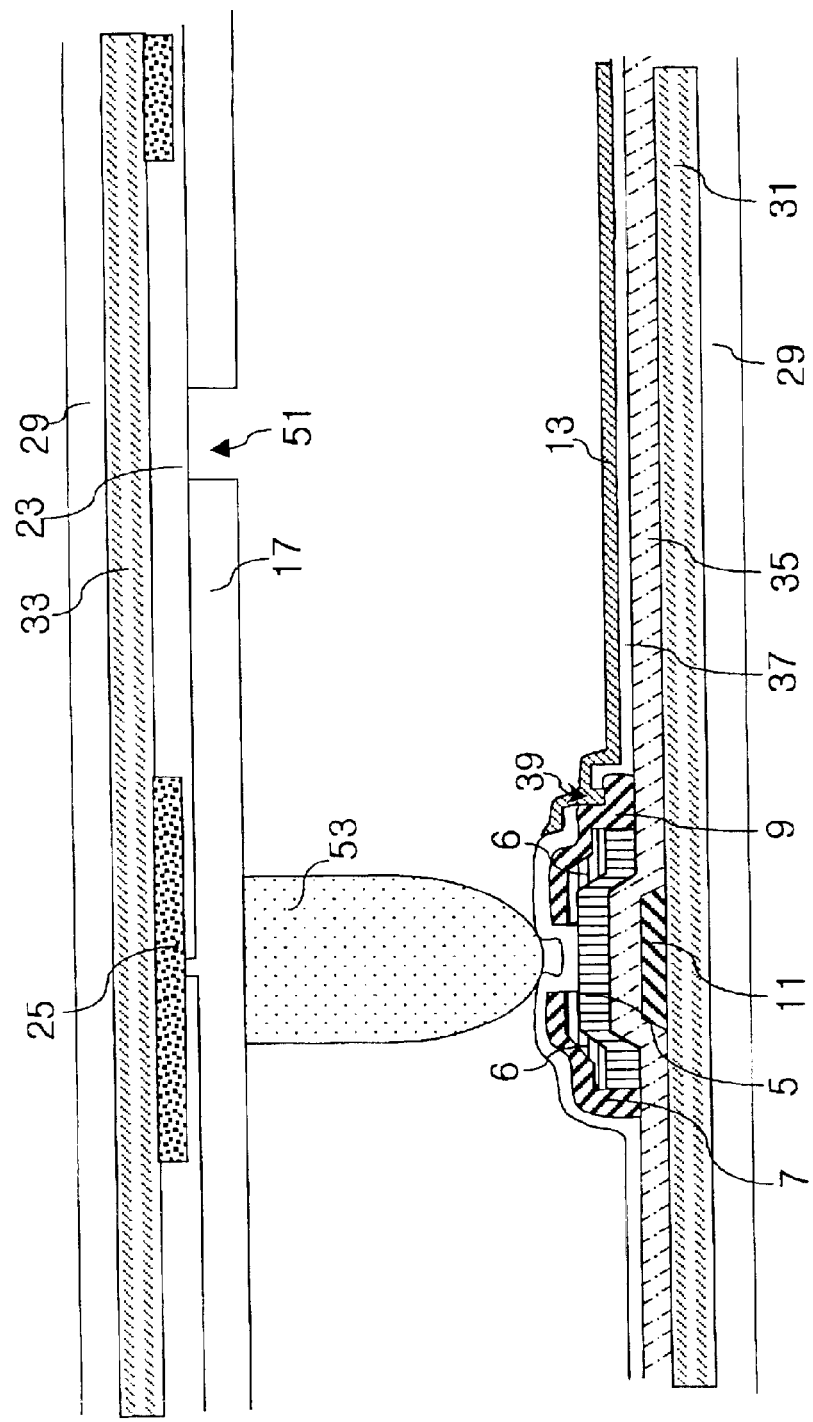
Figure 3C:
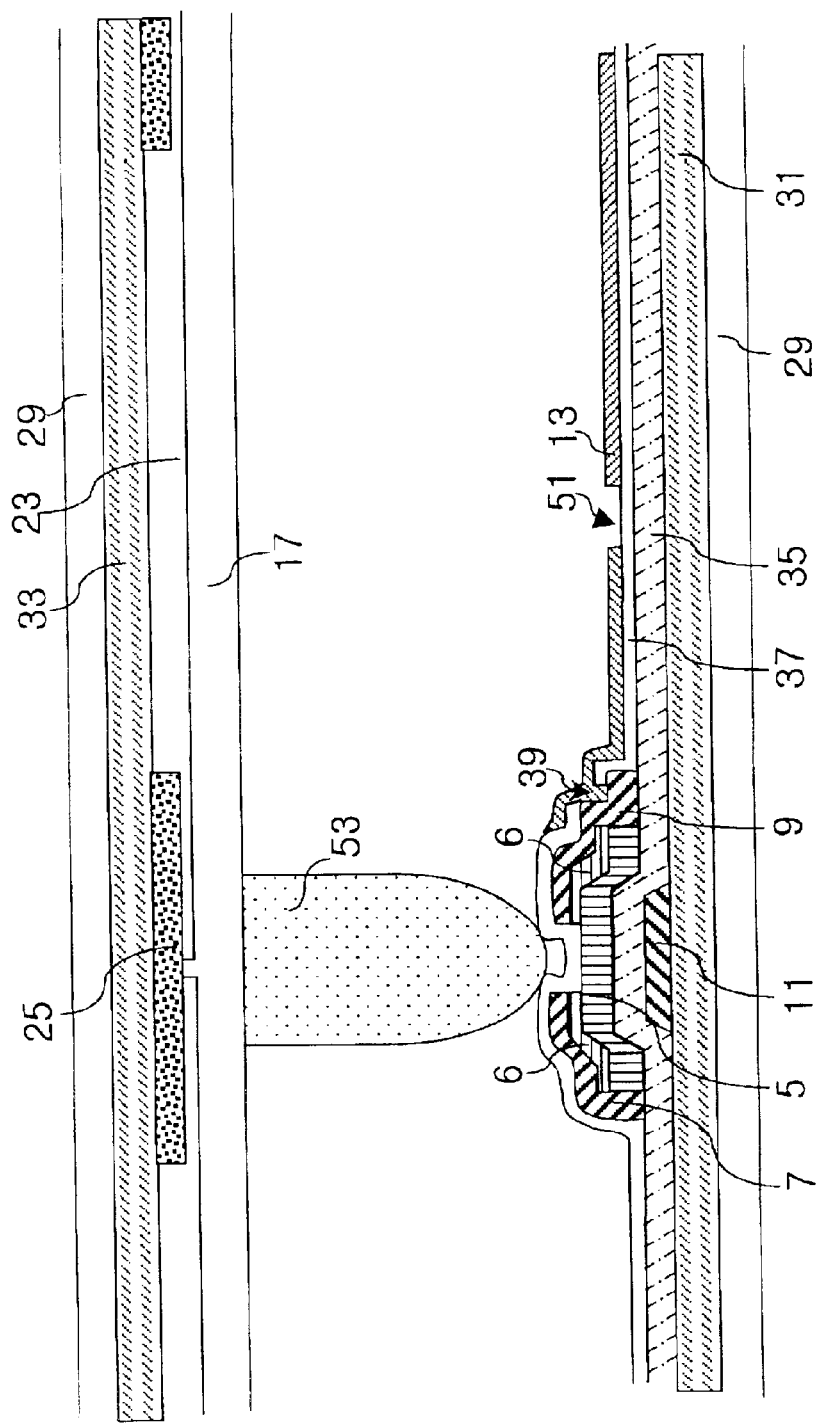
Figure 4D:
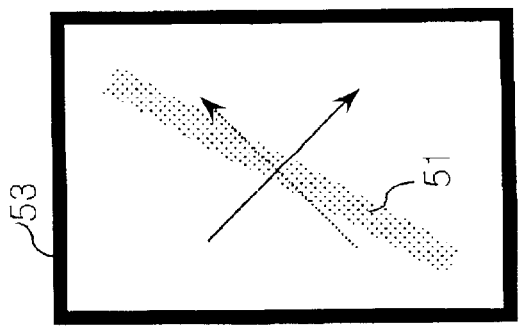
FIGS. 4A, 4B, 4C, and 4D are plan views showing various electric field inducing window and dielectric frame of the multi-domain liquid crystal display devices according to an embodiment of the present invention.
Figure 4C:
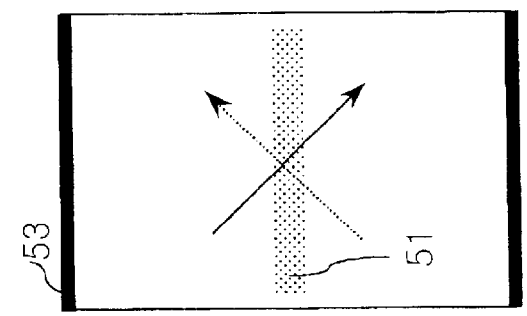
Figure 4B:
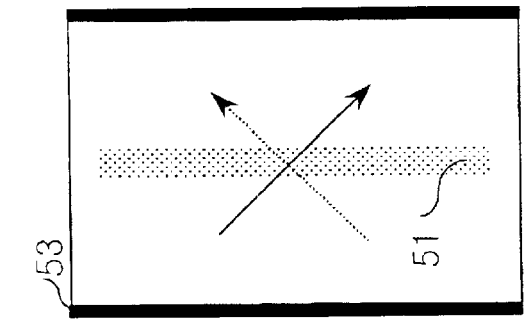
Figure 4A:
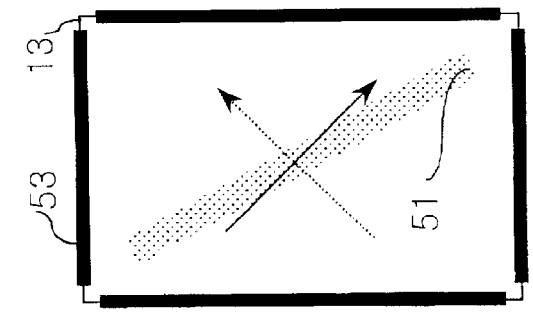
Figure 5D:
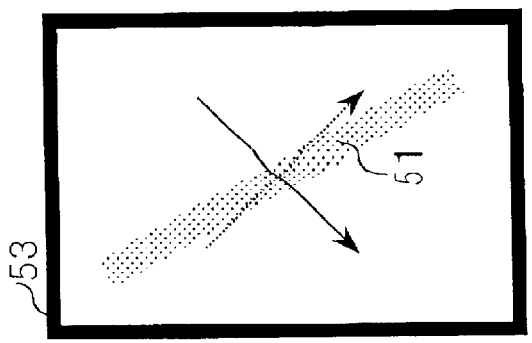
FIGS. 5A, 5B, 5C, and 5D are plan views showing various electric field inducing window and dielectric frame of the multi-domain liquid crystal display devices according to an embodiment of the present invention.
Figure 5C:
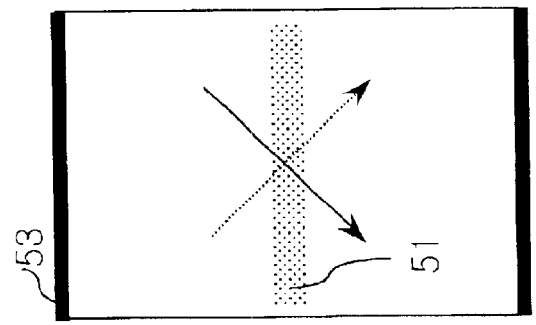
Figure 5B:
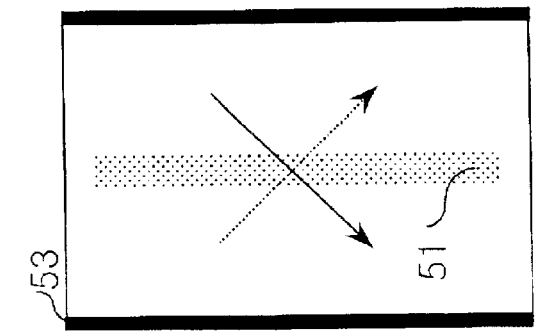
Figure 5A:
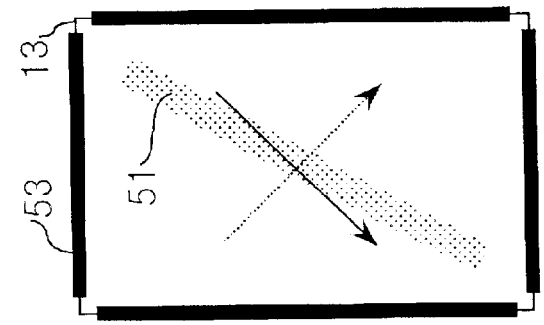
Figure 7D:
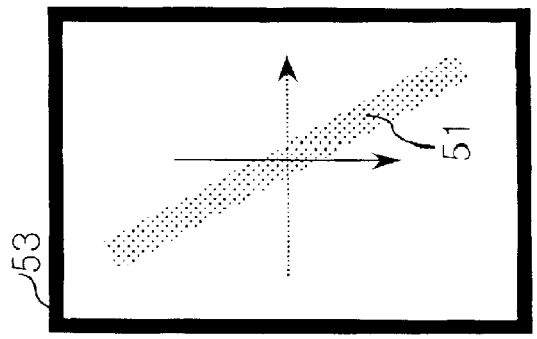
FIGS. 7A, 7B, 7C, and 7D are plan views showing various electric field inducing window and dielectric frame of the multi-domain liquid crystal display devices according to an embodiment of the present invention.
Figure 7C:
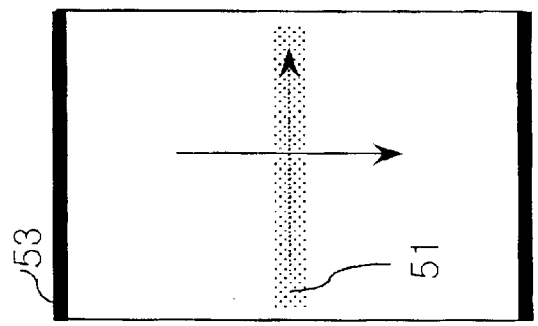
Figure 7B:
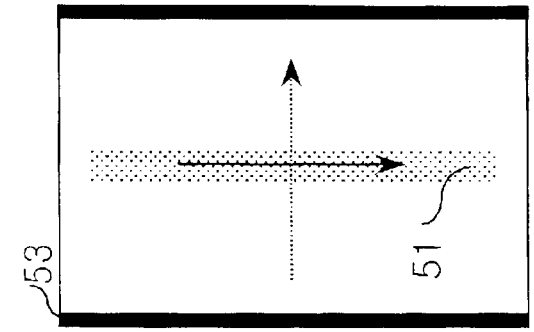
Figure 7A:
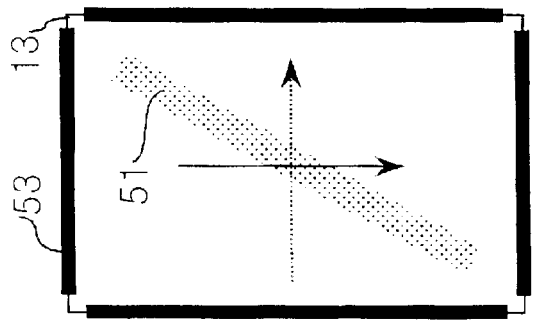
Figure 8C:
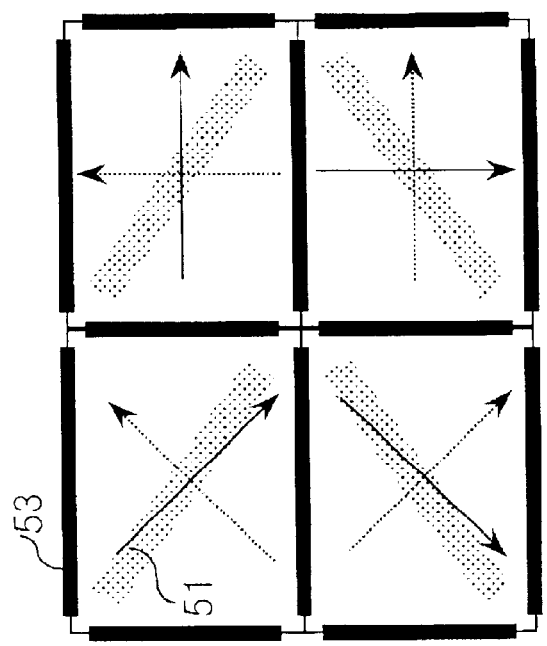
FIGS. 8A, 8B, 8C, 8D, 8E, and 8F are plan views showing various electric field inducing window and dielectric frame of the multi-domain liquid crystal display devices according to an embodiment of the present invention.
Figure 8B:
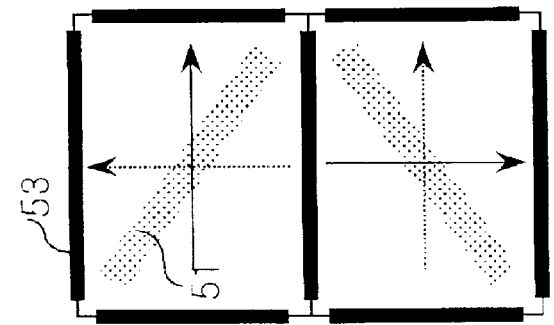
Figure 8A:
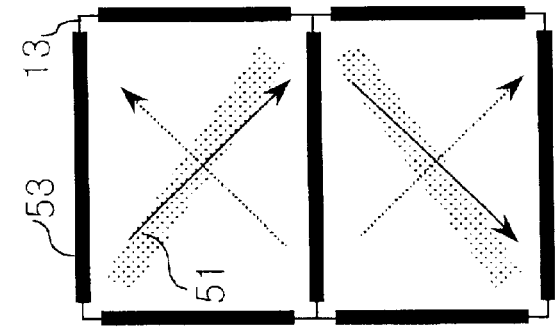
Figure 8F:
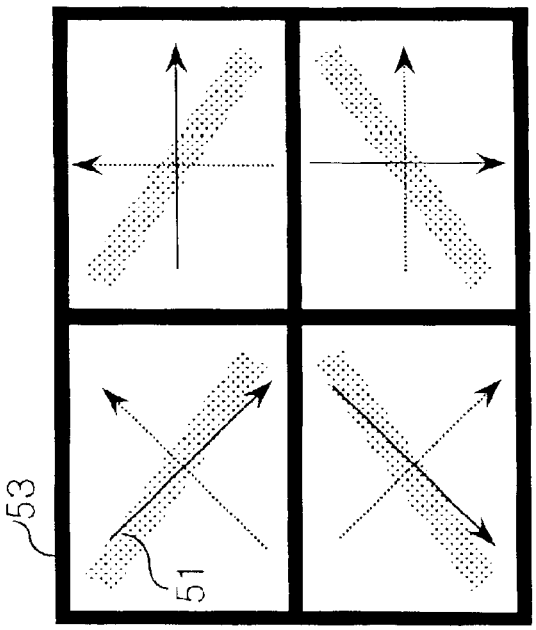
Figure 8E:
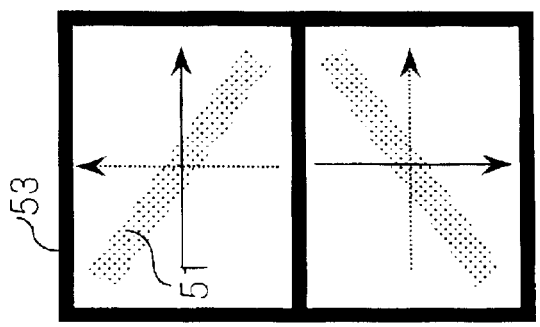
Figure 8D:
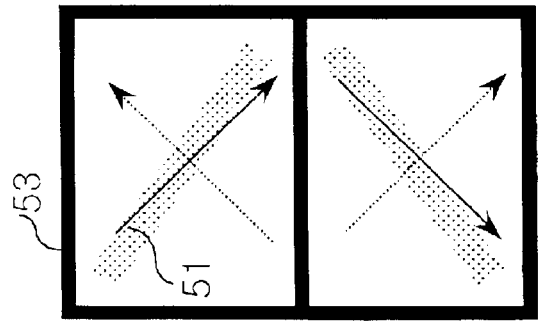
Figure 9C:
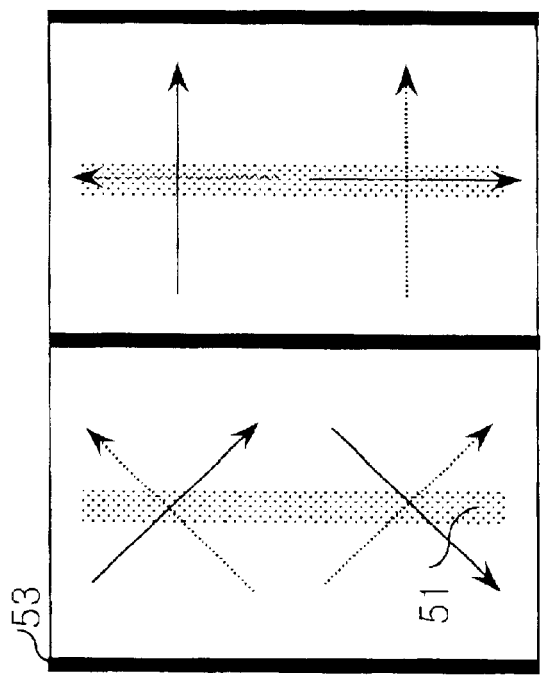
FIGS. 9A, 9B, and 9C are plan views showing various electric field inducing window and dielectric frame of the multi-domain liquid crystal display devices according to an embodiment of the present invention.
Figure 9B:
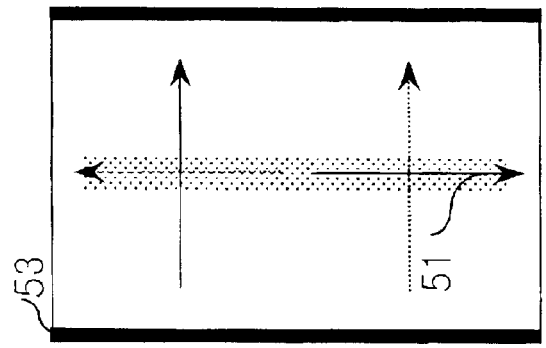
Figure 9A:
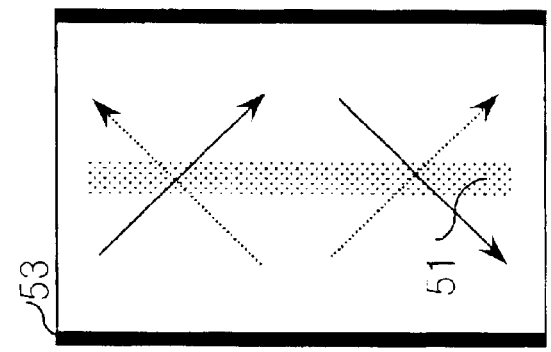
Figure 10C:
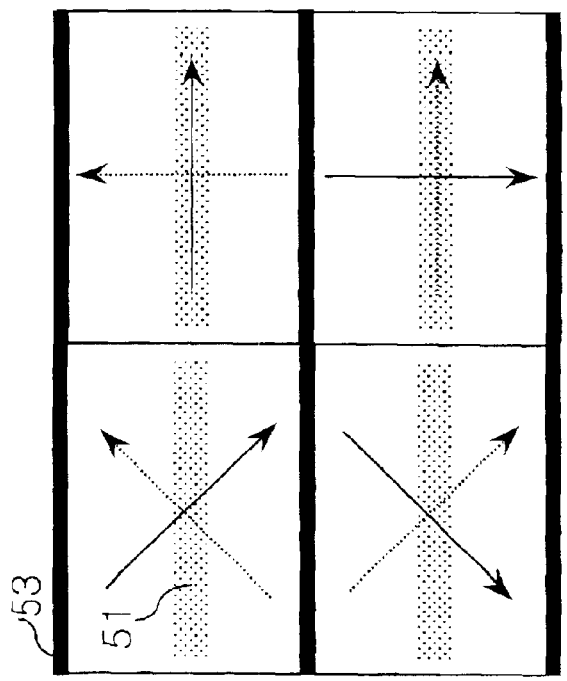
FIGS. 10A, 10B, and 10C are plan views showing various electric field inducing window and dielectric frame of the multi-domain liquid crystal display devices according to an embodiment of the present invention.
Figure 10B:
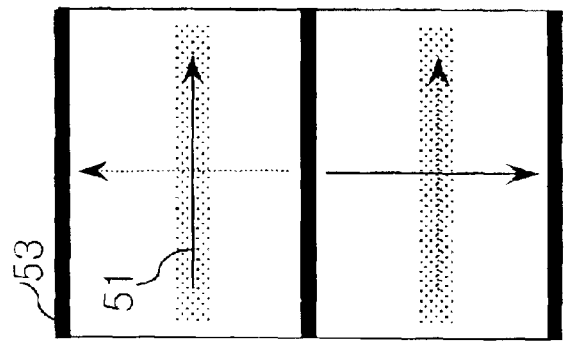
Figure 10A:
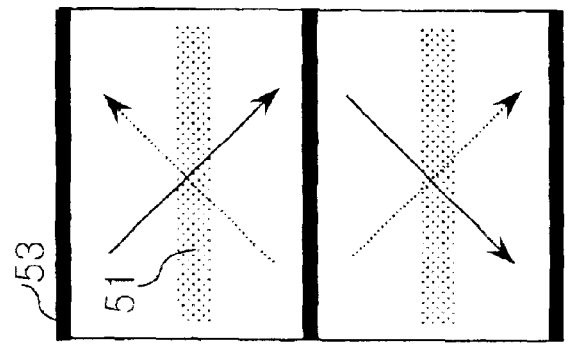
Figure 11C:
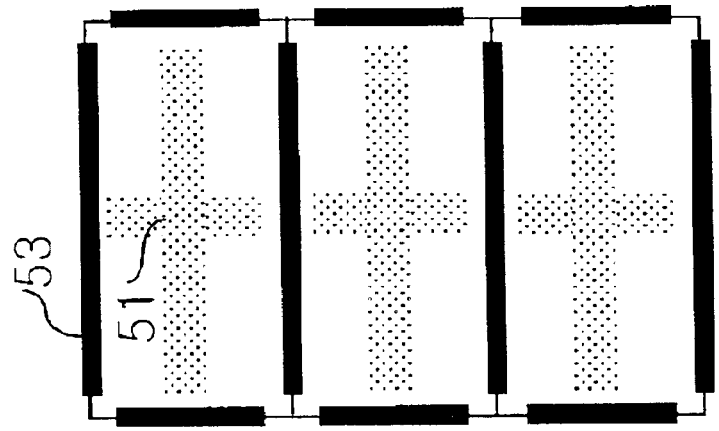
FIGS. 11A, 11B, 11C, 11D, 11E, and 11F are plan views showing various electric field inducing window and dielectric frame of the multi-domain liquid crystal display devices according to an embodiment of the present invention.
Figure 11B:
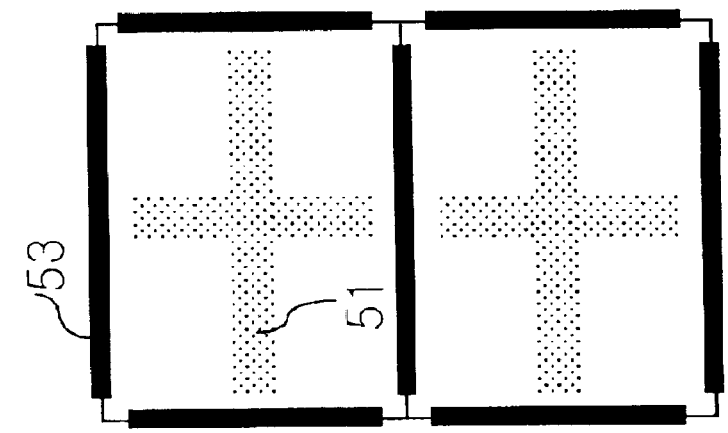
Figure 11A:
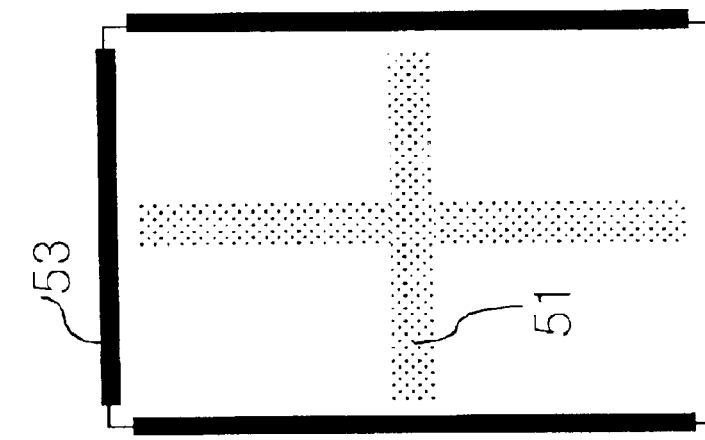
Figure 11F:
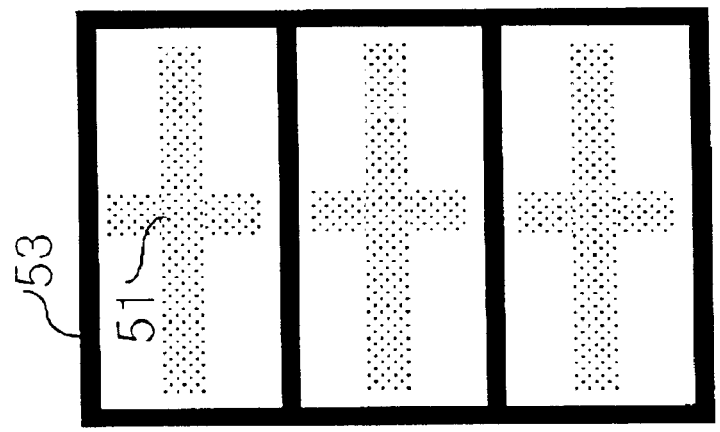
Figure 11E:
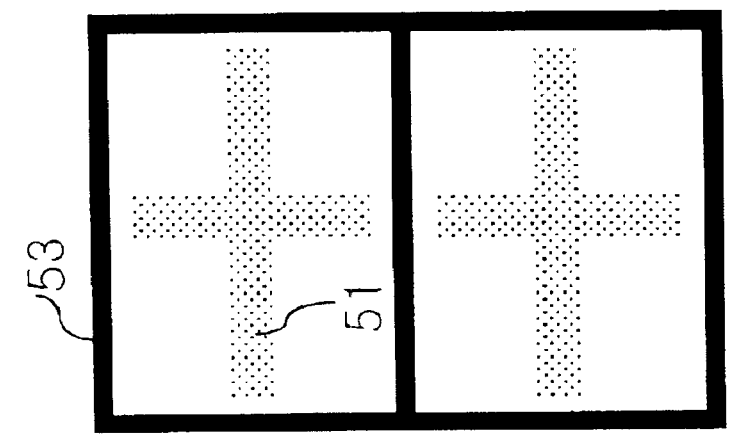
Figure 11D:
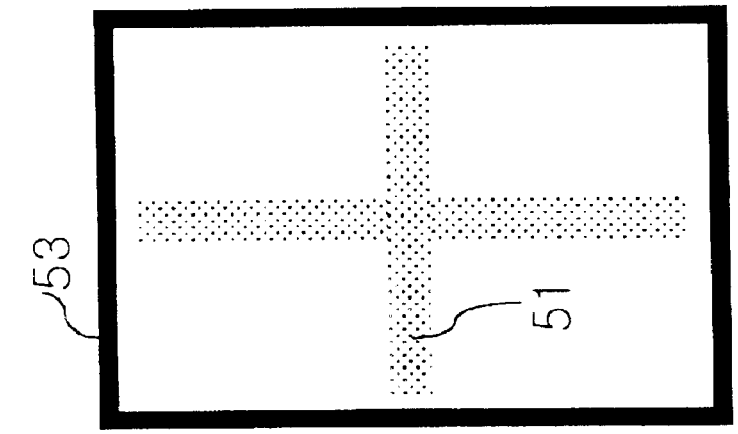
Figure 12C:
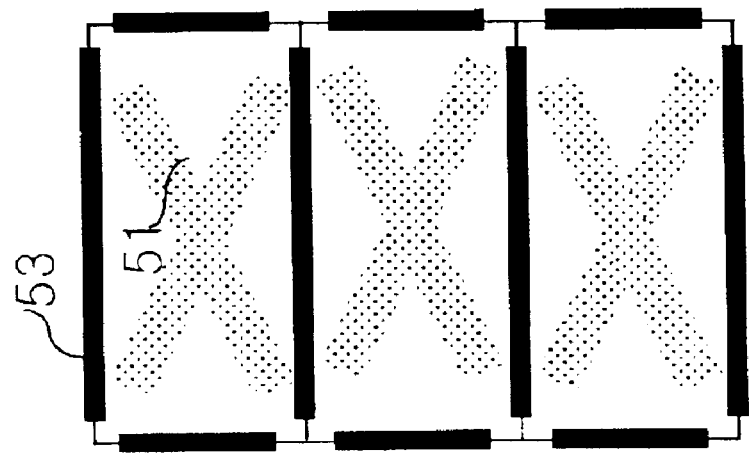
FIGS. 12A, 12B, 12C, 12D, 12E and 12F are plan views showing various electric field inducing window and dielectric frame of the multi-domain liquid crystal display devices according to an embodiment of the present invention.
Figure 12B:
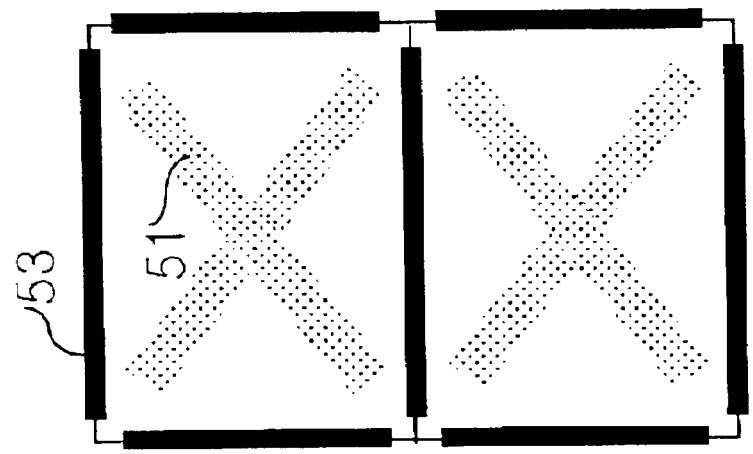
Figure 12A:
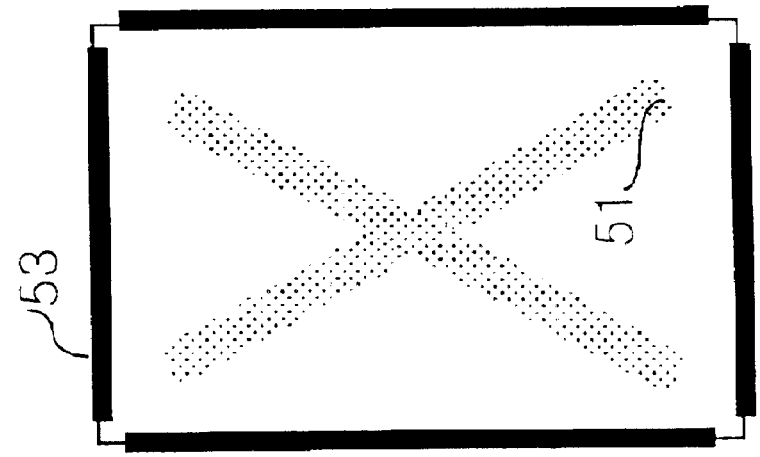
Figure 12F:
Figure 12E:
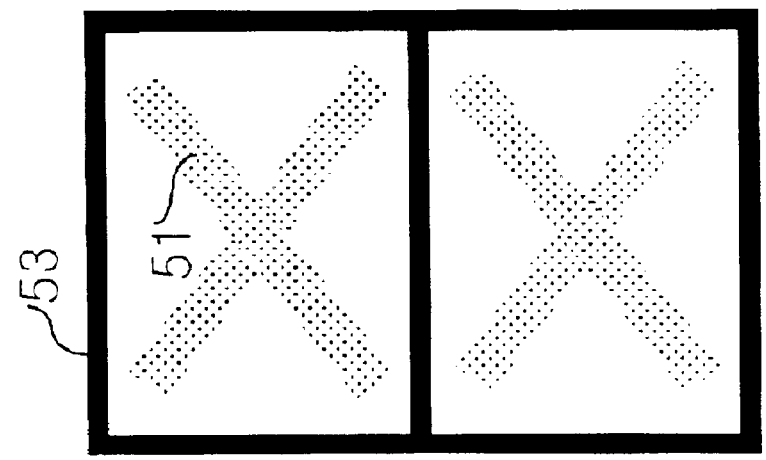
Figure 12D:
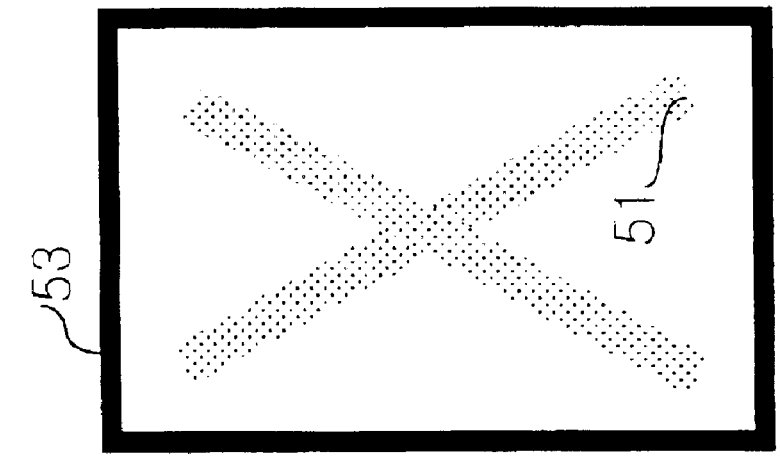
Figure 13D:
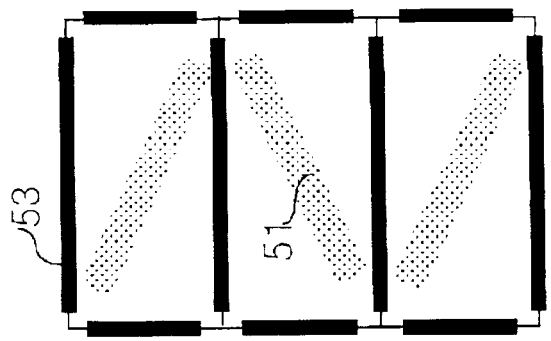
FIGS. 13A, 13B, 13C, 13D, 13E, 13F, 13G and 13H are plan views showing various electric field inducing window and dielectric frame of the multi-domain liquid crystal display devices according to an embodiment of the present invention.
Figure 13C:
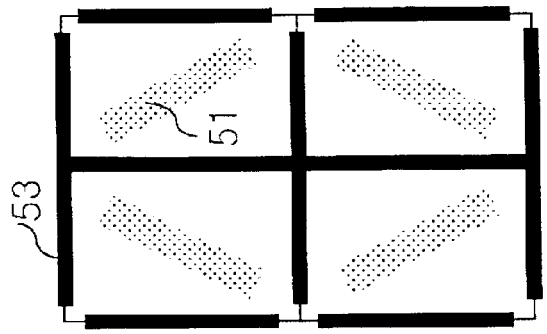
Figure 13B:
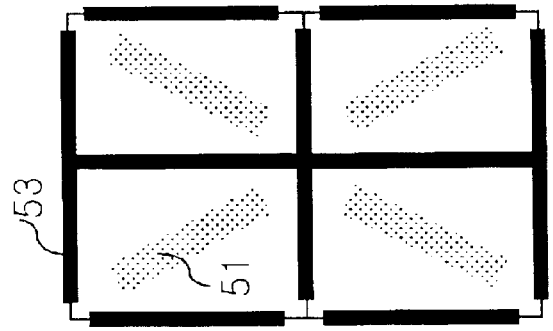
Figure 13A:
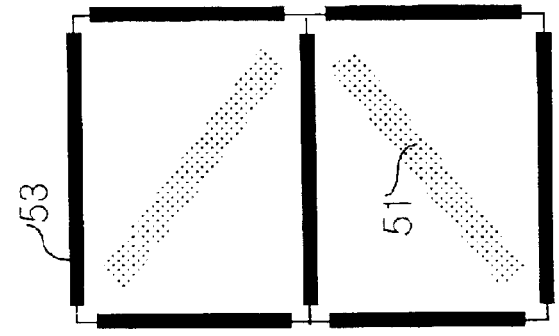
Figure 13H:
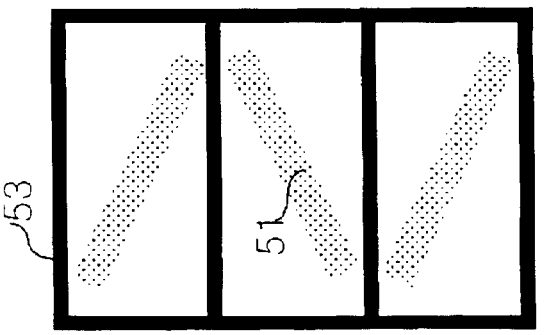
Figure 13G:
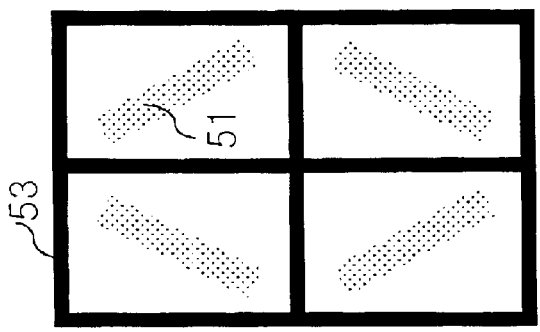
Figure 13F:
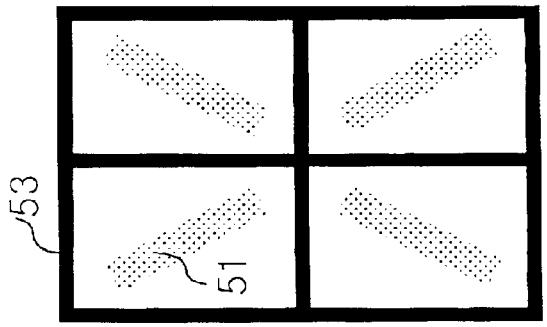
Figure 13E:
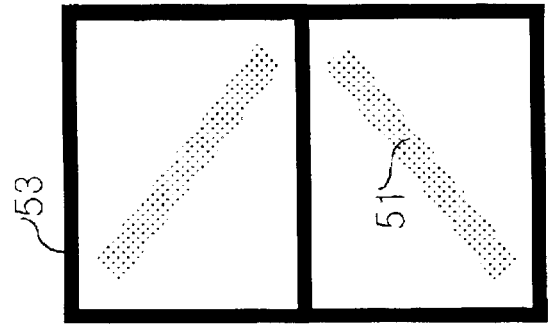
Figure 14A:
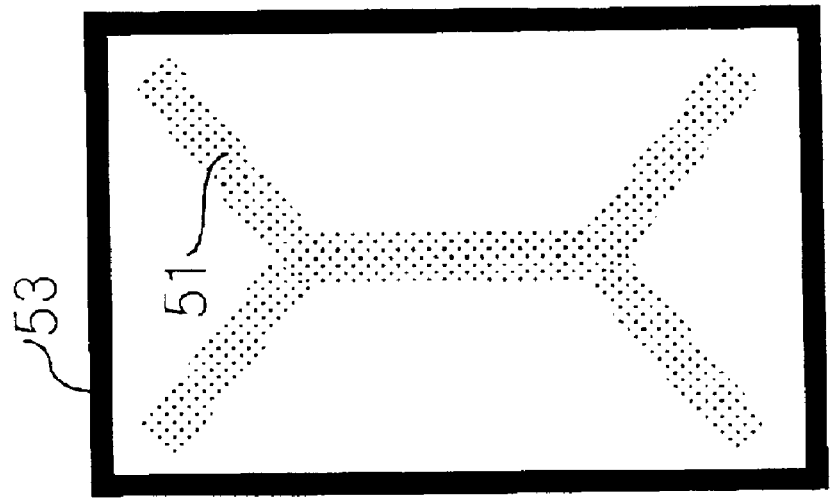
FIGS. 14A and 14B are plan views showing various electric field inducing window and dielectric frame of the multi-domain liquid crystal display devices according to an embodiment of the present invention.
Figure 14B:
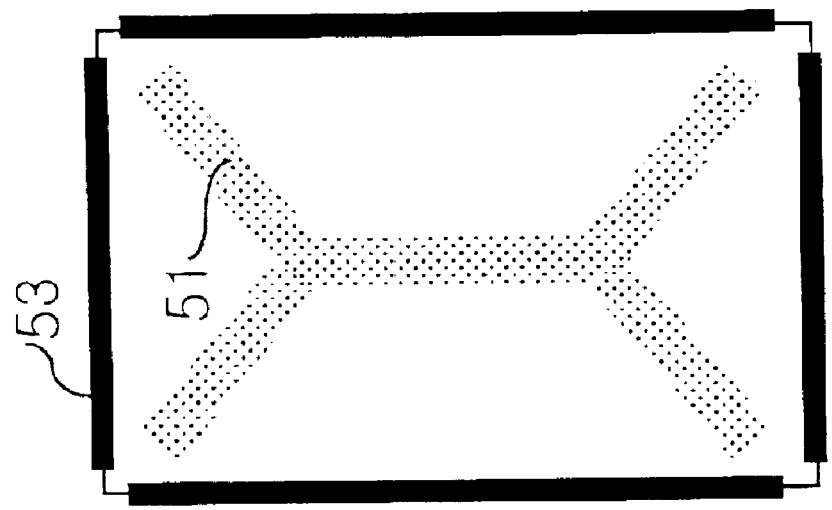
Figure 15A:
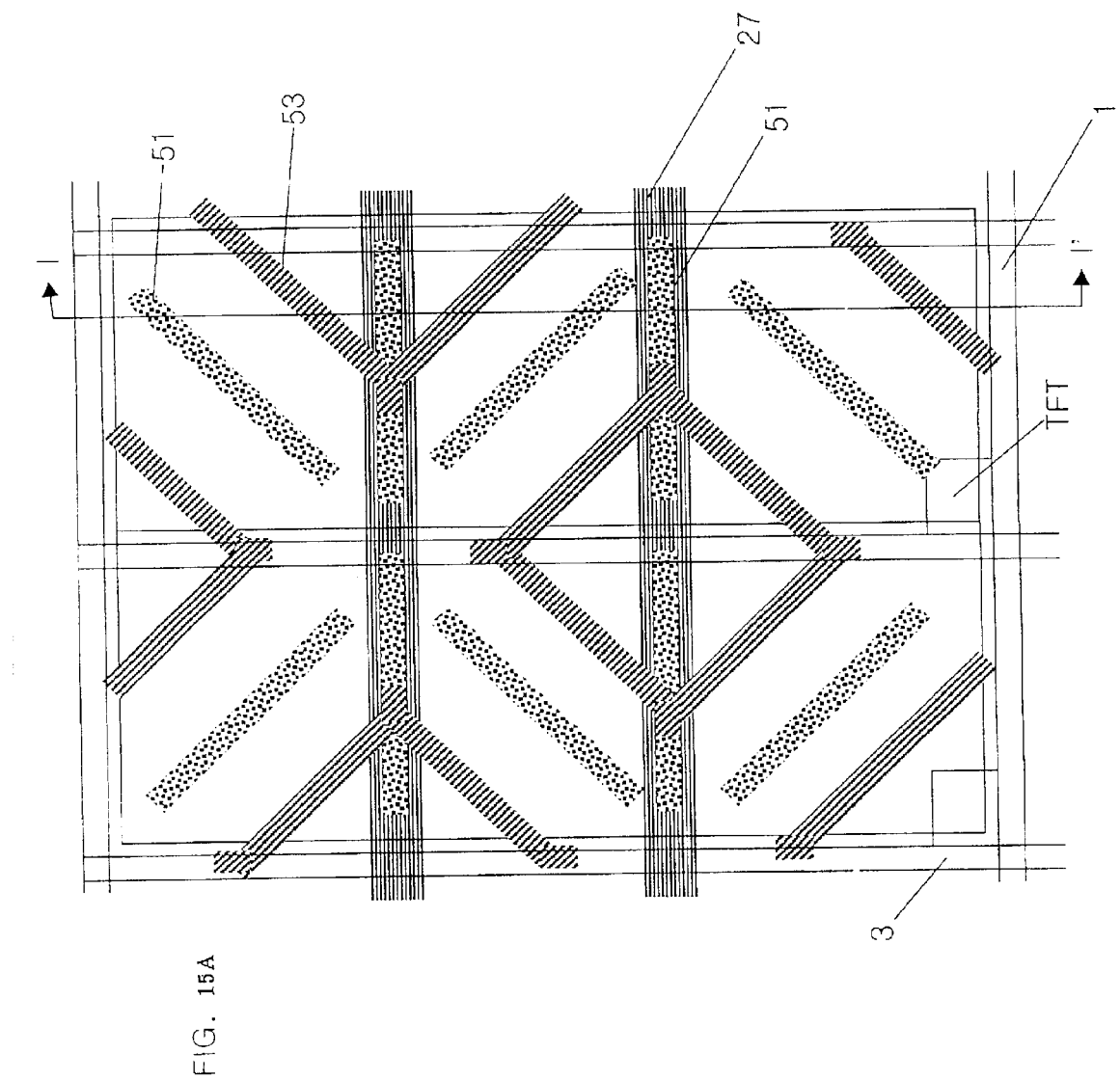
FIGS. 15A and 15B are views showing various electric field inducing window and dielectric frame of the multi-domain liquid crystal display devices according to another embodiment of the present invention.
Figure 15B:
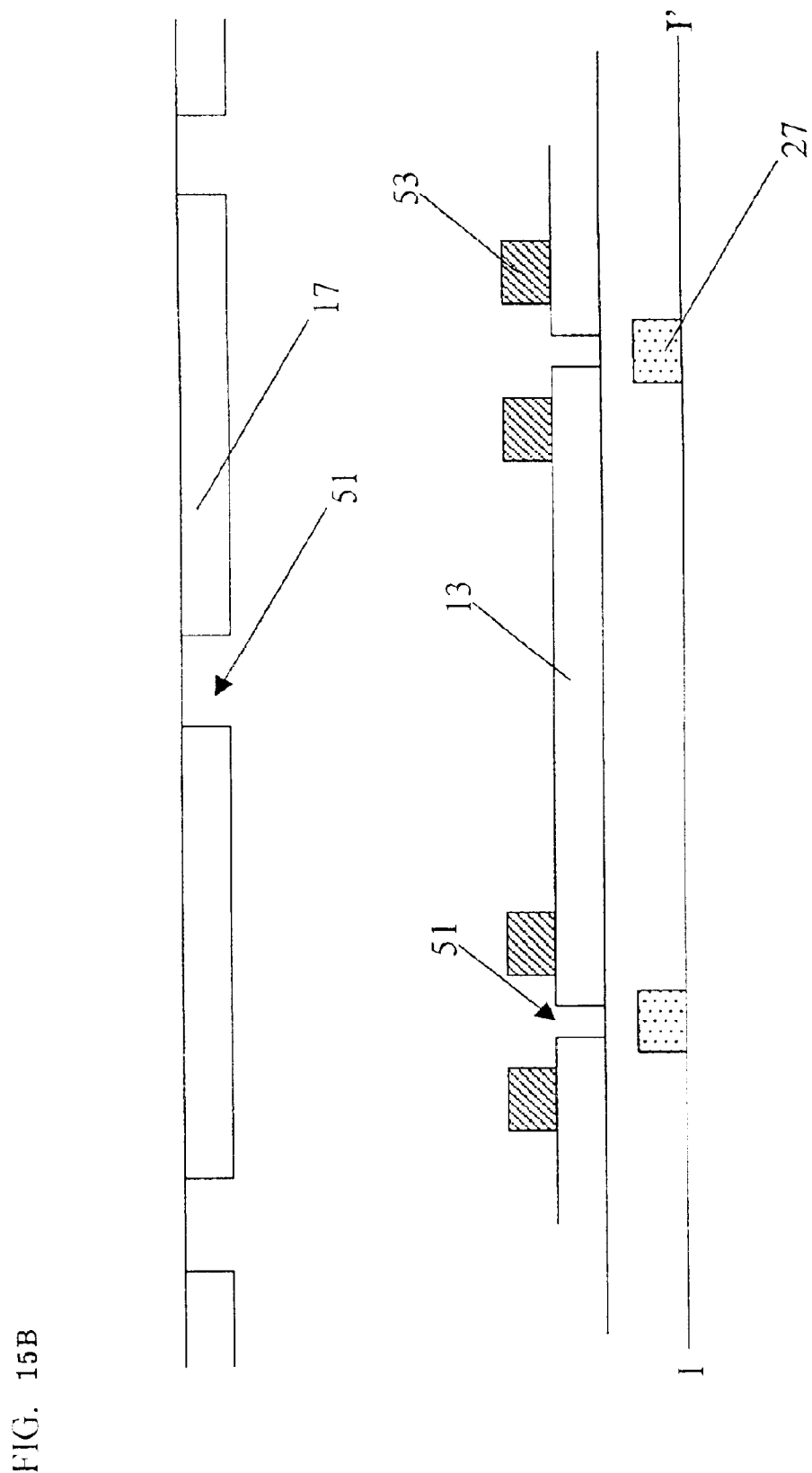

FIGS. 2A, 2B, 2C, and 2D are sectional views of the multi-domain liquid crystal display devices according to the first embodiment of the present invention and FIGS. 3A, 3B, and 3C are sectional views of the multi-domain liquid crystal display devices according to the second embodiment of the present invention.

As shown in the figures, the present invention comprises first and second substrates 31, 33, a plurality of gate bus lines 1 arranged in a first direction on a first substrate and a plurality of data bus lines 3 arranged in a second direction on the first substrate, a TFT, a passivation layer 37, and a pixel electrode 13.

On the second substrate 33, a light shielding layer 25 is formed to shield the light leaked from gate and data bus lines 1, 3, and the TFT, a color filter layer 23 is formed on the light shielding layer, a common electrode 17 is formed on the color filter layer, a dielectric frame in a region other than the pixel region, and a liquid crystal layer is formed between the first and second substrates.

Data bus lines 3 and gate bus lines 1 divide the first substrate 31 into a plurality of pixel regions. The TFT is formed on each pixel region and comprises a gate electrode 11, a gate insulator 35, a semiconductor layer 5, an ohmic contact layer 6, and source/drain electrodes 7, 9. Passivation layer 37 is formed on the whole first substrate 31. Pixel electrode 13 is coupled to the drain electrode 9.

To manufacture the multi-domain LCD of the present invention, in each pixel region on the first substrate 31, a TFT is formed comprising gate electrode 11, gate insulator 35, semiconductor layer 5, ohmic contact layer 6 and source/drain electrodes 7, 9. At this time, a plurality of gate bus lines 1 and a plurality of data bus lines 3 are formed to divide the first substrate 31 into a plurality of pixel regions.

Gate electrode 11 and gate bus line 1 are formed by sputtering and patterning a metal such as Al, Mo, Cr, Ta, Al alloy, etc. Alternatively, it is possible to form the gate electrode and gate bus line as a double layer, the double layer is formed from different materials.

The gate insulator 35 is formed by depositing $SiN_x$, $SiO_x$, or BCB (BenzoCycloButene), acrylic resin using PECVD thereon. Semiconductor layer 5 and the ohmic contact layer 6 are formed by depositing with PECVD(Plasma Enhancement Chemical Vapor Deposition) and patterning amorphous silicon (a-Si) and doped amorphous silicon ($n^+$a-Si), respectively. Also, gate insulator 35, amorphous silicon (a-Si), and doped amorphous silicon ($n^+$a-Si) can be formed by PECVD and patterned.

Data bus line 3 and source/drain electrodes 7, 9 are formed by sputtering and patterning a metal such as Al, Mo, Cr, Ta, Al alloy, etc. Alternatively, it is possible to form the data bus line and source/drain electrodes as a double layer, the double layer is formed from different materials.

A storage electrode (not shown in the figures) is formed to overlap gate bus line 1, the storage electrode makes a storage capacitor with gate bus line 1.

Subsequently, passivation layer 37 is formed with BCB (BenzoCycloButene), acrylic resin, polyimide based material, $SiN_x$ or $SiO_x$ on the whole first substrate. Pixel electrode 13 is formed by sputtering and patterning a metal such as ITO(indium tin oxide). A contact hole 39 is formed to connect the pixel electrode 13 to the drain 9 and storage electrodes by opening and patterning a part of the passivation layer 37 on drain electrode 9.

On the second substrate 33, a light shielding layer 25 is formed to shield any light leakage from gate and data bus lines 1, 3, and the TFT. A color filter layer 23 is formed R, G, B (red, green, blue) elements to alternate on the light shielding layer 25.

A common electrode 17 is formed with ITO on the color filter layer 23, and a liquid crystal layer is formed by injecting liquid crystal between the first and second substrates. The liquid crystal layer may include liquid crystal molecules having positive or negative dielectric anisotropy. Also, the liquid crystal layer may include chirals dopants.

On at least one substrate between the first and second substrates, a dielectric frame 53 is formed by depositing photosensitive material in a region other than a region where the pixel electrode 13 is formed and patterning in various shapes using photolithography.

The dielectric frame 53 includes material of which dielectric constant is same or smaller than that of the liquid crystal, and the dielectric constant thereof is preferably below 3, for example, photoacrylate or BCB (BenzoCycloButene).

As an embodiment, the dielectric frame could include mixture of polyimide and carbon black or mixture of acrylic resin and carbon black. And then, the dielectric frame shields light leakage from an area except the pixel region and distorts the electric field applied to the liquid crystal layer. In this case, the dielectric constant of the liquid crystal layer is about 4, preferably the dielectric constant of the dielectric frame is below 3.5.

On the other hand, as shown in the FIGS. 3A, 3B, and 3C, the dielectric frame is also used as a spacer to maintain uniformly gap between the first and second substrates.

Furthermore, the dielectric frame 53 is formed on at least one substrate between the first and second substrates. And, an electric field inducing window 51 is formed on at least one substrate between the first and second substrates.

At this time, the dielectric frame 53 and electric field inducing window 51 could be formed on same substrate together. The electric field inducing window 51 is formed by patterning hole or slit in the common electrode 17 or pixel electrode 13.

On at least one substrate, a compensation film 29 is formed with polymer. The compensation film is a negative uniaxial film, which has one optical axis, and compensates the phase difference of the direction according to viewing-angle. Hence, it is possible to compensate effectively the right-left viewing-angle by widening the area without gray inversion, increasing contrast ratio in an inclined direction, and forming one pixel to multi-domain.

In the present multi-domain liquid crystal display device, it is possible to form a negative biaxial film as the compensation film, which has two optical axes and wider viewing-angle characteristics as compared with the negative uniaxial film. The compensation film could be formed on both substrates or on one of them.

After forming the compensation film, polarizer is formed on at least one substrate. At this time, the compensation film and polarizer are preferably composed as one.

In the multi-domain LCD of the present invention, the aperture ratio is enhanced by an optimum structure design of a "n-line" thin film transistor (U.S. Pat. No. 5,694,185) so as to reduce power consumption, increase luminance, and lower reflection, thus improving contrast ratio. Aperture ratio is increased by forming the TFT above the gate line and providing a "n-line" TFT. The parasitic capacitor, occurring between the gate bus line and the drain electrode, can be reduced when a TFT having the same channel length as the symmetrical TFT structure is manufactured due to effect of channel length extension.

The multi-domain LCD of the present invention has a dielectric frame 53 on the pixel electrode and/or common electrode, or an electric field inducing window 51 like a hole or slit in the pixel electrode, passivation layer, gate insulator, color filter layer, and/or common electrode by patterning, thereby electric field distortion effect and multi-domain are obtained.

That is, from forming electric field inducing window 51 or dielectric frame 53, the multi-domain is obtained by dividing each pixel into four domains such as in a "+", "x", or "double Y" shape, or dividing each pixel horizontally, vertically, and/or diagonally, and differently alignment-treating or forming alignment directions on each domain and on each substrate.

FIGS. 4, 5, 6, 7, 8, 9, 10, 11, 12, 13, 14 and 15 are plan views showing various electric field inducing window and dielectric frame of the multi-domain liquid crystal display devices according to embodiments of the present invention. In the figures, the solid lined-arrow represents an alignment direction of the second substrate, and the dotted lined-arrow represents an alignment direction of the first substrate.

Further, the dielectric frame 53 and at least one electric field inducing window 51 are patterned in various shapes, which obtains multi-domain effect. The electric field inducing window may be a slit or hole. Furthermore, neighboring two pixels and two alignment directions are associated, which obtains multi-domain effect.

In multi-domain LCD of the present invention, an alignment layer(not shown in the figure) is formed over the whole first and/or second substrates. The alignment layer includes a material such as polyamide or polyimide based materials, PVA (polyvinylalcohol), polyamic acid or $SiO_2$. When rubbing is used to determine an alignment direction, it should be possible to apply any material suitable for the rubbing treatment.

Moreover, it is possible to form the alignment layer with a photosensitive material such as PVCN (polyvinylcinnamate), PSCN (polysiloxanecinnamate), and CelCN (cellulosecinnamate) based materials. Any material suitable for the photo-aligning treatment may be used.

Irradiating light once on the alignment layer determines the alignment or pretilt direction and the pretilt angle. The light used in the photo-alignment is preferably a light in a range of ultraviolet light, and any of unpolarized light, linearly polarized light, and partially polarized light can be used.

In the rubbing or photo-alignment treatment, it is possible to apply one or both of the first and second substrates, and to apply different aligning-treatment on each substrate.

From the aligning-treatment, a multi-domain LCD is formed with at least two domains, and LC molecules of the LC layer are aligned differently one another on each domain. That is, the multi-domain is obtained by dividing each pixel into four domains such as in a "+" or "x" shape, or dividing each pixel horizontally, vertically, and/or diagonally, and differently alignment-treating or forming alignment directions on each domain and on each substrate.

It is possible to have at least one domain of the divided domains unaligned. It is also possible to have all domains unaligned.

Consequently, since the multi-domain LCD of the present invention forms the dielectric frame in a region except the pixel region and the electric field inducing window in the pixel region, electric field is distorted and multi-domain effect is obtained.

Moreover, the dielectric frame is used as a light shielding layer or spacer, which could obtain simplify of manufacturing processes and a high aperture ratio.

Also, in the case of conducting an alignment-treatment, a high response time and a stable LC structure can be obtained by a pretilt angle and an anchoring energy. Moreover, the disclination is thus removed to thereby improve the brightness.

It will be apparent to those skilled in the art that various modifications can be made in the liquid crystal display device of the present invention without departing from the sprit or scope of the invention. Thus, it is intended that the present invention covers the modifications and variations of this invention provided they come within the scope of the appended claims and their equivalents.

What is claimed is:

1. A multi-domain liquid crystal display device comprising:

first and second substrates facing each other;

a liquid crystal layer between said first and second substrates;

a plurality of gate bus lines arranged in a first direction on said first substrate and a plurality of data bus lines arranged in a second direction on said first substrate to define a pixel region;

a pixel electrode in said pixel region;

a dielectric frame located exclusively in a region other than where said pixel electrode is formed, said dielectric frame distorting electric field applied to said liquid crystal layer;

a common electrode on said second substrate; and an alignment layer on at least one substrate between said first and second substrates.

2. The multi-domain liquid crystal display device according to claim 1, further comprising:

a gate insulator over said whole first substrate;

a passivation layer on said gate insulator over said whole first substrate;

a light shielding layer on said second substrate;

a color filter layer on said light shielding layer; and an over coat layer on said color filter layer.

3. The multi-domain liquid crystal display device according to claim 1, wherein said dielectric frame is patterned.

4. The multi-domain liquid crystal display device according to claim 1, wherein said dielectric frame maintains uniformly gap between said first and second substrates.

5. The multi-domain liquid crystal display device according to claim 1, wherein dielectric constant of said dielectric frame is different than that of said liquid crystal layer.

6. The multi-domain liquid crystal display device according to claim 1, wherein said dielectric frame shields light leakage from a region other than said pixel region.

7. The multi-domain liquid crystal display device according to claim 1, wherein said dielectric frame includes photosensitive materials.

8. The multi-domain liquid crystal display device according to claim 1, wherein said dielectric frame includes a material selected from the group consisting of BCB (BenzoCycloButene) and photoacrylate.

9. The multi-domain liquid crystal display device according to claim 1, wherein said dielectric frame includes mixture of polyimide and carbon black.

10. The multi-domain liquid crystal display device according to claim 1, wherein said dielectric frame includes mixture of acrylic resin and carbon black.

11. The multi-domain liquid crystal display device according to claim 1, wherein said pixel electrode has an electric field inducing window inside of itself.

12. A multi-domain liquid crystal display device, comprising:

first and second substrates facing each other;

a liquid crystal layer between said first and second substrates;

a plurality of gate bus lines arranged in a first direction on said first substrate and a plurality of data bus lines arranged in a second direction on said first substrate to define a pixel region;

a pixel electrode in said pixel region;

a dielectric frame located exclusively in a region other than where said pixel electrode is formed, said dielectric frame distorting electric field applied to said liquid crystal layer;

a common electrode on said second substrate;

an alignment layer on at least one substrate between said first and second substrates;

a gate insulator over said whole first substrate;

a passivation layer on said gate insulator over said whole first substrate, the passivation layer having an electric field including window inside;

a light shielding layer on said second substrate;

a color filter layer on said light shielding layer; and an over coat layer on said color filter layer.

13. A multi-domain liquid crystal display device, comprising:

first and second substrates facing each other;

a liquid crystal layer between said first and second substrates;

a plurality of gate bus lines arranged in a first direction on said first substrate and a plurality of data bus lines arranged in a second direction on said first substrate to define a pixel region;

a pixel electrode in said pixel region;

a dielectric frame located exclusively in a region other than where said pixel electrode is formed, said dielectric frame distorting electric field applied to said liquid crystal layer;

a common electrode on said second substrate;

an alignment layer on at least one substrate between said first and second substrates;

a gate insulator over said whole first substrate, the gate insulator having an electric field including window inside;

a passivation layer on said gate insulator over said whole first substrate;

a light shielding layer on said second substrate;

a color filter layer on said light shielding layer; and an over coat layer on said color filter layer.

14. The multi-domain liquid crystal display device according to claim 1, wherein said common electrode has an electric field inducing window inside of itself.

15. A multi-domain liquid crystal display device, comprising:

first and second substrates facing each other;

a liquid crystal layer between said first and second substrates;

a plurality of gate bus lines arranged in a first direction on said first substrate and a plurality of data bus lines arranged in a second direction on said first substrate to define a pixel region;

a pixel electrode in said pixel region;

a dielectric frame located exclusively in a region other than where said pixel electrode is formed, said dielectric frame distorting electric field applied to said liquid crystal layer;

a common electrode on said second substrate;

an alignment layer on at least one substrate between said first and second substrates;

a gate insulator over said whole first substrate;

a passivation layer on said gate insulator over said whole first substrate;

a light shielding layer on said second substrate;

a color filter layer on said light shielding layer, the color filter layer having an electric field including window inside; and an over coat layer on said color filter layer.

16. A multi-domain liquid crystal display device, comprising:

first and second substrates facing each other;

a liquid crystal layer between said first and second substrates;

a plurality of gate bus lines arranged in a first direction on said first substrate and a plurality of data bus lines arranged in a second direction on said first substrate to define a pixel region;

a pixel electrode in said pixel region;

a dielectric frame located exclusively in a region other than where said pixel electrode is formed, said dielectric frame distorting electric field applied to said liquid crystal layer;

a common electrode on said second substrate;

an alignment layer on at least one substrate between said first and second substrates;

a gate insulator over said whole first substrate;

a passivation layer on said gate insulator over said whole first substrate;

a light shielding layer on said second substrate;

a color filter layer on said light shielding layer; and an over coat layer on said color filter layer, the over coat layer having an electric field including window inside.

17. The multi-domain liquid crystal display device according to claim 2, wherein said passivation layer includes a material selected from the group consisting of BCB (BenzoCycloButene), acrylic resin, and polyimide compound.

18. The multi-domain liquid crystal display device according to claim 2, wherein said passivation layer includes a material selected from the group consisting of silicon nitride and silicon oxide.

19. The multi-domain liquid crystal display device according to claim 1, wherein said pixel electrode includes a material selected from the group consisting of ITO (indium tin oxide), aluminum, and chromium.

20. The multi-domain liquid crystal display device according to claim 1, wherein said common electrode includes ITO (indium tin oxide).

21. The multi-domain liquid crystal display device according to claim 1, wherein said pixel region is divided into at least two portions, liquid crystal molecules in said liquid crystal layer in each portion being driven differently from each other.

22. The multi-domain liquid crystal display device according to claim 1, wherein said alignment layer is divided into at least two portions, liquid crystal molecules in said liquid crystal layer in each portion being aligned differently from each other.

23. The multi-domain liquid crystal display device according to claim 22, wherein at least one portion of said alignment layer is alignment-treated.

24. The multi-domain liquid crystal display device according to claim 22, wherein all portions of said alignment layer are non-alignment-treated.

25. The multi-domain liquid crystal display device according to claim 1, wherein said liquid crystal layer includes liquid crystal molecules having positive dielectric anisotropy.

26. The multi-domain liquid crystal display device according to claim 1, wherein said liquid crystal layer includes liquid crystal molecules having negative dielectric anisotropy.

27. The multi-domain liquid crystal display device according to claim 1, further comprising:

a negative uniaxial film on at least one substrate.

28. The multi-domain liquid crystal display device according to claim 1, further comprising:

a negative biaxial film on at least one substrate.

29. The multi-domain liquid crystal display device according to claim 1, wherein said liquid crystal layer includes chiral dopants.

30. A multi-domain liquid crystal display device comprising:

first and second substrates facing each other;

a liquid crystal layer between said first and second substrates;

a plurality of gate bus lines arranged in a first direction on said first substrate and a plurality of data bus lines arranged in a second direction on said first substrate to define a pixel region;

a pixel electrode in said pixel region;

a dielectric frame surrounding said pixel region, said dielectric frame distorting electric field applied to said liquid crystal layer and said dielectric frame being located exclusively in a region other than where said pixel electrode is formed;

a common electrode on said second substrate; and an alignment layer on at least one substrate between said first and second substrates.

31. The multi-domain liquid crystal display device according to claim 30, further comprising:

a gate insulator over said whole first substrate;

a passivation layer on said gate insulator over said whole first substrate;

a light shielding layer on said second substrate;

a color filter layer on said light shielding layer; and an over coat layer on said color filter layer.

32. The multi-domain liquid crystal display device according to claim 30, wherein said dielectric frame is patterned.

33. The multi-domain liquid crystal display device according to claim 30, wherein dielectric constant of said dielectric frame is different than that of said liquid crystal layer.

34. The multi-domain liquid crystal display device according to claim 30, wherein said dielectric frame shields light leakage from a region other than said pixel region.

35. The multi-domain liquid crystal display device according to claim 30, wherein said dielectric frame includes photosensitive materials.

36. The multi-domain liquid crystal display device according to claim 30, wherein said dielectric frame includes a material selected from the group consisting of BCB (BenzoCycloButene) and photoacrylate.

37. The multi-domain liquid crystal display device according to claim 30, wherein said dielectric frame includes mixture of polyimide and carbon black.

38. The multi-domain liquid crystal display device according to claim 30, wherein said dielectric frame includes mixture of acrylic resin and carbon black.

* * * * *